(12) United States Patent
Hoffman et al.

(10) Patent No.: US 9,914,397 B2
(45) Date of Patent: Mar. 13, 2018

(54) HITCH-MOUNTED COLLAPSIBLE STAIRS FOR VEHICLE

(71) Applicant: RADIO SYSTEMS CORPORATION, Knoxville, TN (US)

(72) Inventors: Patrick Hoffman, Arlington, TX (US); David King, Allen, TX (US); Thomas Murphy, Arlington, TX (US)

(73) Assignee: RADIO SYSTEMS CORPORATION, Knoxville, TN (US)

( * ) Notice: Subject to any disclaimer, the term of this patent is extended or adjusted under 35 U.S.C. 154(b) by 0 days.

(21) Appl. No.: 15/072,320

(22) Filed: Mar. 16, 2016

(65) Prior Publication Data

US 2017/0267181 A1 Sep. 21, 2017

(51) Int. Cl.
*B60R 3/00* (2006.01)
*B60R 3/02* (2006.01)

(52) U.S. Cl.
CPC .................................. *B60R 3/007* (2013.01)

(58) Field of Classification Search
CPC ........... B60R 3/00; B60R 3/005; B60R 3/007; B60R 3/02; B60R 9/06
See application file for complete search history.

(56) References Cited

U.S. PATENT DOCUMENTS

| 3,743,320 | A | * | 7/1973 | Clark | B60R 3/02 |
| | | | | | 182/91 |
| D315,134 | S | * | 3/1991 | Springer | D12/203 |
| 5,372,287 | A | * | 12/1994 | Deguevara | B60R 9/06 |
| | | | | | 224/309 |
| 5,478,124 | A | * | 12/1995 | Warrington | B60D 3/00 |
| | | | | | 280/416.1 |
| 5,511,813 | A | * | 4/1996 | Kravitz | B60D 1/42 |
| | | | | | 280/495 |
| 5,752,639 | A | * | 5/1998 | Rice | B60R 9/10 |
| | | | | | 224/510 |
| 5,975,553 | A | * | 11/1999 | Van Vleet | B60D 1/46 |
| | | | | | 280/483 |
| 6,170,843 | B1 | * | 1/2001 | Maxwell | B60R 3/02 |
| | | | | | 182/91 |
| 6,685,204 | B1 | * | 2/2004 | Hehr | B60R 3/02 |
| | | | | | 280/164.1 |
| 6,769,704 | B2 | * | 8/2004 | Cipolla | B60R 3/007 |
| | | | | | 224/521 |
| 7,114,736 | B2 | * | 10/2006 | Stodola | B60R 9/06 |
| | | | | | 224/486 |
| 7,168,722 | B1 | * | 1/2007 | Piotrowski | B60R 3/02 |
| | | | | | 280/166 |
| 7,204,501 | B2 | * | 4/2007 | Bang | B60R 3/02 |
| | | | | | 248/131 |
| 7,766,357 | B2 | * | 8/2010 | Arvanites | B60R 3/007 |
| | | | | | 182/127 |
| 7,954,836 | B2 | * | 6/2011 | Mann | B60R 3/02 |
| | | | | | 280/163 |

(Continued)

*Primary Examiner* — James A Shriver, II
*Assistant Examiner* — Vaughn Coolman
(74) *Attorney, Agent, or Firm* — Baker, Donelson, Bearman, Caldwell & Berkowitz, PC (57) ABSTRACT

A hitch-mountable, collapsible stair assembly is disclosed for use in assisting mounting into a raised vehicle bed. The steps rotate between a generally vertical stowed position and a generally horizontal in-use position. The height of the steps above the ground is adjustable. The lower step can also be extended for ease of use.

8 Claims, 5 Drawing Sheets

(56) References Cited

U.S. PATENT DOCUMENTS

| | | | |
|---|---|---|---|
| 8,251,387 B2* | 8/2012 | Gansberger | B60R 3/007 280/166 |
| 8,727,364 B2* | 5/2014 | Masanek, Jr. | B60D 1/36 280/163 |
| D713,310 S * | 9/2014 | Stringfellow | D12/203 |
| 8,851,495 B1* | 10/2014 | Masanek, Jr. | B60R 3/00 280/163 |
| 9,145,035 B2* | 9/2015 | Masanek, Jr. | B60D 1/243 |
| 9,266,476 B2* | 2/2016 | Mendoza | B60R 3/02 |
| 2005/0023315 A1* | 2/2005 | Skinner | B62D 43/02 224/506 |
| 2005/0146112 A1* | 7/2005 | Bang | B60R 3/02 280/166 |
| 2005/0252720 A1* | 11/2005 | Chant | E06C 5/02 182/127 |
| 2009/0008896 A1* | 1/2009 | Phillips | B60R 9/06 280/166 |
| 2009/0230656 A1* | 9/2009 | Blakley | B60D 1/60 280/504 |
| 2009/0243249 A1* | 10/2009 | Arvanites | B60R 3/007 280/166 |
| 2010/0007116 A1* | 1/2010 | Columbia | B60D 1/06 280/511 |
| 2010/0164196 A1* | 7/2010 | Collins | B60R 9/06 280/166 |
| 2014/0327223 A1* | 11/2014 | Dilts | B60R 3/007 280/166 |

\* cited by examiner

HITCH-MOUNTED COLLAPSIBLE STAIRS FOR VEHICLE

TECHNICAL FIELD

The invention generally relates to improved access to vehicle beds, such as pick-up truck, SUV, and van beds, and more specifically to collapsible stairs removably mountable to a vehicle at a trailer hitch.

BACKGROUND

Some vehicle beds are considerably higher off the ground than can be readily or easily stepped into from ground level. Some domestic-use vehicles having such relatively high beds include pick-up trucks, sports utility vehicles, minivans and vans. Often the beds of commercial, medium, and heavy trucks and equipment are also difficult to reach. For example, the beds tend to be elevated on tow trucks, flatbed trucks, box trucks, moving vans, dump trucks, mobile cranes, and the like. Most of these vehicle beds are primarily designed for rear-entry, wherein a user approaches the rear of the vehicle and climbs over the rear bumper (or similar) onto the vehicle bed. Such elevated vehicle beds are difficult to navigate for both human and pet users.

BRIEF DESCRIPTION OF THE DRAWINGS

The other objects, features and advantages will occur to those skilled in the art from the following description of the preferred embodiment and the accompanying drawings in which.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Modifications may be made within the scope of the embodiments herein without departing from the spirit thereof, and the embodiments herein include all such modifications.

DETAILED DESCRIPTION OF SOME EMBODIMENTS

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that changes may be made without departing from the scope of the invention. The following detailed description is therefore not to be taken in a limiting sense.

It is common to bolt or otherwise mount a hitch or tow hitch to the rear of a truck or other vehicle. A hitch attaches directly to a vehicle and provides a connection between the vehicle and the towed device, such as a trailer. Hitch installations are most often considered permanent and are typically mounted directly to the vehicle chassis. A receiver-style hitch defines a receptacle, typically a square tubular of a standard size, for removably attaching ball mounts, hitch bars, or other accessories. A removable accessory, such as a ball mount, is telescopically received to the receiver and removably attached, such as by a pin and clip assembly and other attachment mechanisms known in the art. Hitches and accessories, their permanent or removable mounting, etc., are known in the art and not described fully herein.

Figure 1:
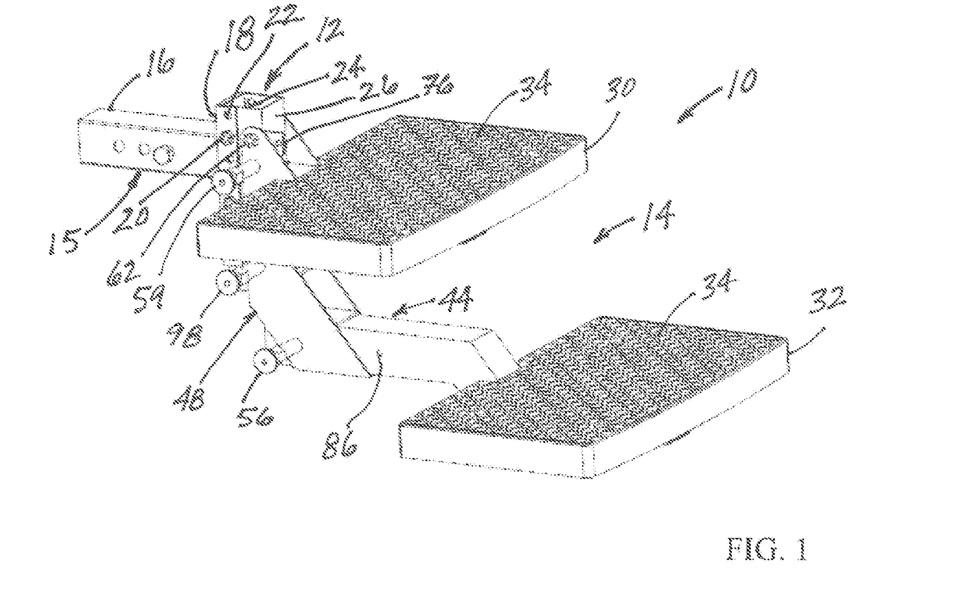
FIG. 1 is a perspective view of an exemplary hitch-mountable, collapsible, multiple-step, stair assembly seen in an extended in-use position, wherein the steps are generally horizontal and wherein the lower step is extended forwardly, according to aspects of the disclosure.
Figure 2:
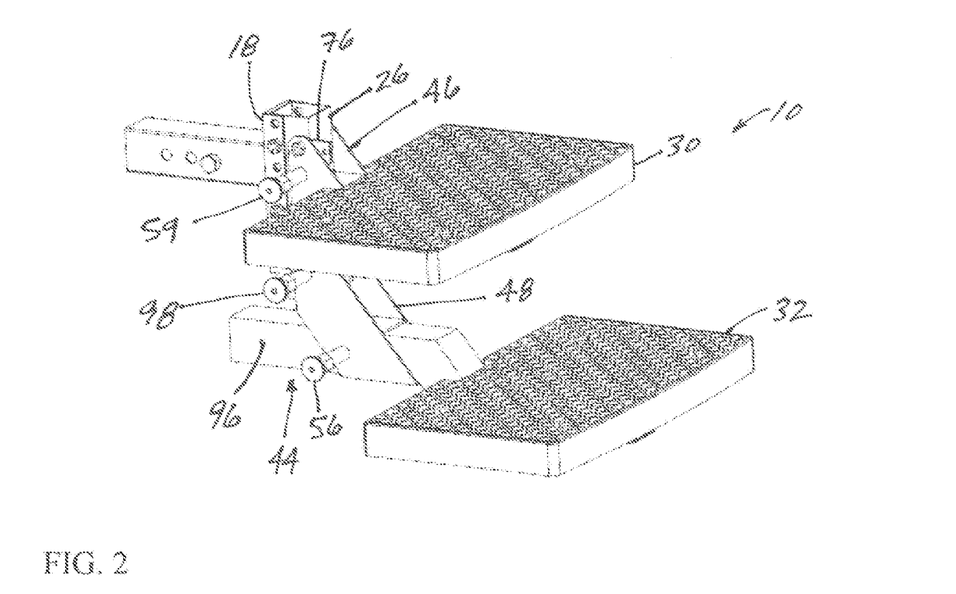
FIG. 2 is a perspective view of the exemplary collapsible stair assembly of FIG. 1 seen in an in-use position, wherein the steps are generally horizontal and wherein the lower step is in a home position, according to aspects of the disclosure.
Figure 3:
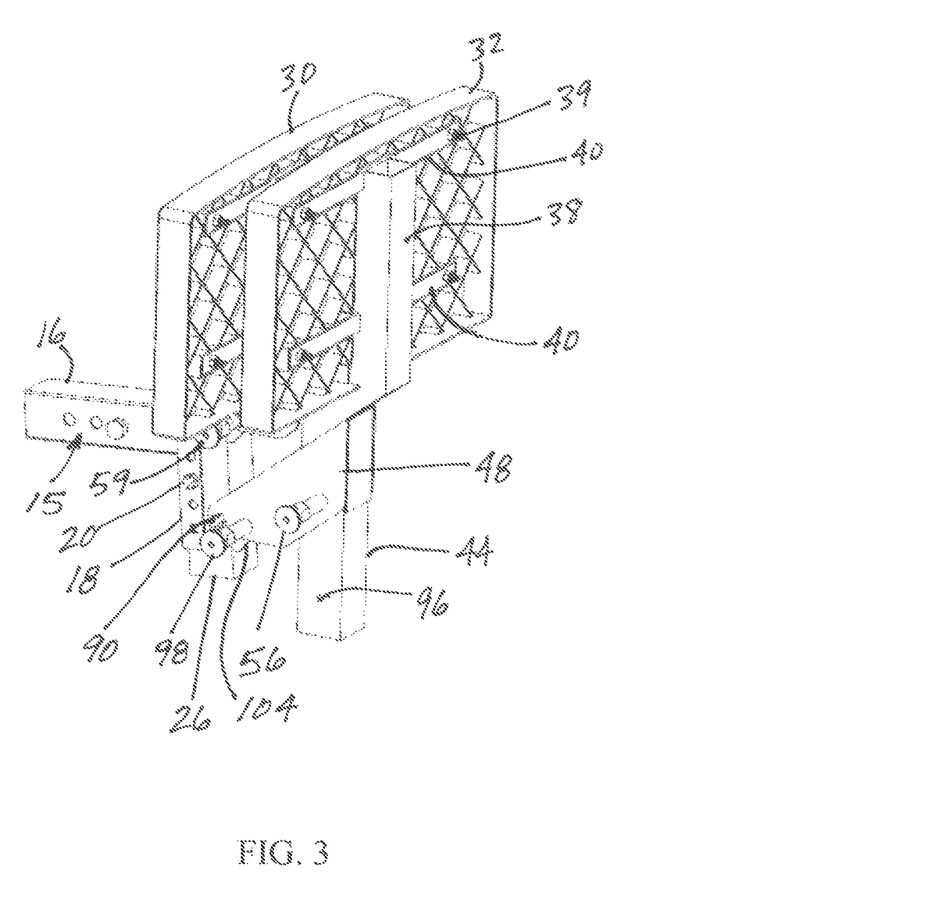
FIG. 3 is a perspective view of the exemplary collapsible stair assembly of FIG. 1 seen in a stowed position wherein the steps are generally vertically oriented, according to aspects of the disclosure.
Figure 4:
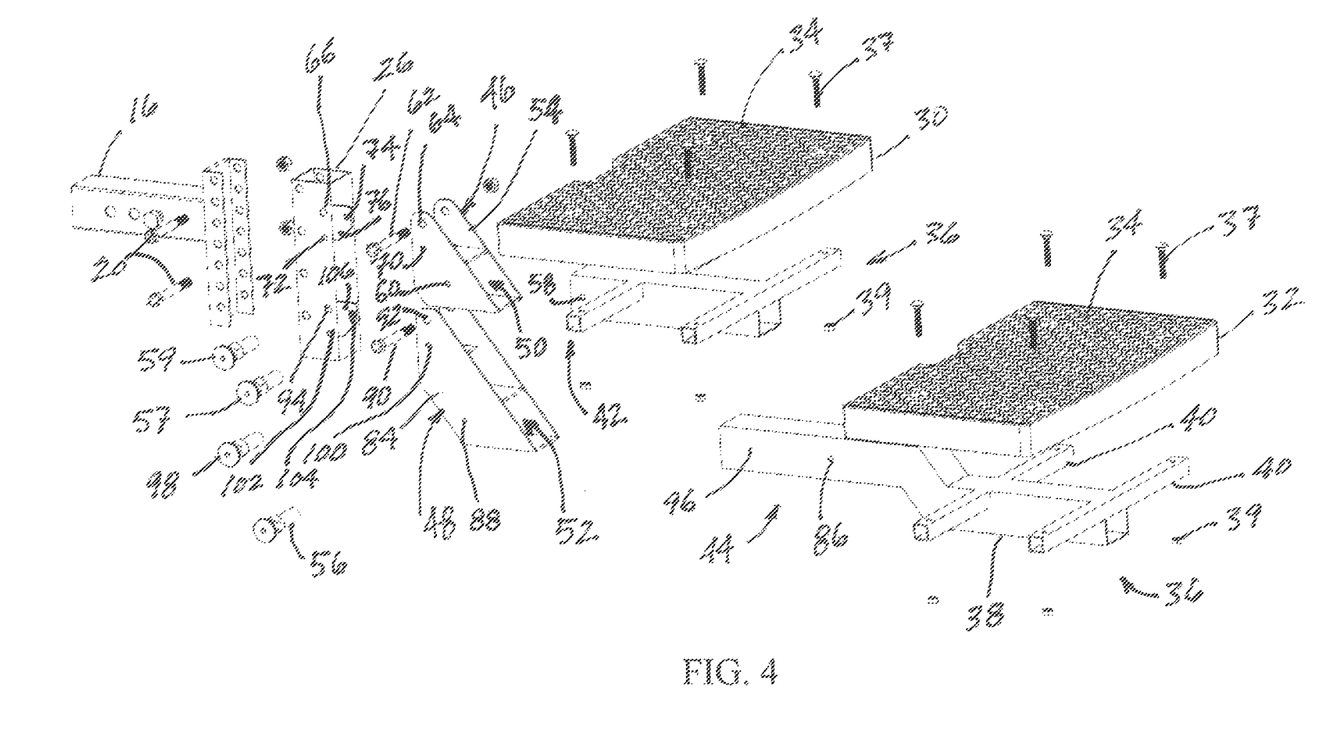
FIG. 4 is an exploded perspective view of the exemplary collapsible stair assembly of FIG. 1 according to aspects of the disclosure.

FIG. 1 is a perspective view of an exemplary hitch-mountable, collapsible, multiple-step, stair assembly seen in an extended in-use position, wherein the steps are generally horizontal and wherein the lower step is extended forwardly, according to aspects of the disclosure. FIG. 2 is a perspective view of the exemplary collapsible stair assembly of FIG. 1 seen in an in-use position, wherein the steps are generally horizontal and wherein the lower step is in a home position, according to aspects of the disclosure. FIG. 3 is a perspective view of the exemplary collapsible stair assembly of FIG. 1 seen in a stowed position wherein the steps are generally vertically oriented, according to aspects of the disclosure. FIG. 4 is an exploded perspective view of the exemplary collapsible stair assembly of FIG. 1 according to aspects of the disclosure. The Figures are discussed collectively.

The collapsible stair assembly 10, is movable by a user between the in-use and extended position as seen in FIG. 1 (often referred to as "the extended position" herein), an in-use position as seen in FIG. 2 wherein the lower step is in a home position (and not in an extended position), and a stowed position as seen in FIG. 3. Additionally, an embodiment has a height adjustment sub-assembly allowing selective adjustment of the height between the lower step and the ground (or between the upper step and the vehicle bed). Conceptually, the stair assembly 10 can considered as having a mounting subassembly 12 and a collapsible step subassembly 14.

The mounting subassembly 12 has an insert tubular 16 which cooperates with a standard hitch receptacle, also typically a tubular (not shown), and removably attaches to the hitch at an attachment mechanism 15. The insert tubular 16 is generally horizontal when attached to the hitch. Receiver style hitches allowing mounting of various accessories are known in the art and not described in detail here and can be pin and hook, bolt and nut, etc.

The mounting subassembly 12 includes a mounting bracket 18 for attaching to the step subassembly 14. In the embodiment shown, the mounting bracket 18 extends generally vertically while engaged with a vehicle hitch. The bracket 18 is fixedly attached to the insert tubular 16, such as by welding, in an embodiment.

In an embodiment, the step subassembly 14 is removably or adjustably mountable to the mounting subassembly 12. In an embodiment, fasteners 20 extend through mounting holes 22 defined in the mounting bracket 18 and cooperating, aligned mounting holes 24 defined in the step mount 26. Practitioners will recognize other ways to attach the mounting and step subassemblies, such as attachment of different subassembly members, fixed attachment mechanisms (such as welding), and removable or releasable attachment mechanisms (such as using fasteners as bolt and nut, pin and clip, and the like). Practitioners will also recognize other ways to selectively allow movement of the subassemblies relative to one another for adjustment of step height relative to the ground or vehicle bed, such as by pull-pin assembly, quick release mechanisms, pin and clip assemblies, bolt and nut assemblies, telescoping assemblies, spring-loaded pin assemblies, etc.

In the embodiment shown, multiple mounting holes 22 are defined along the mounting bracket 18 at various heights, thus allowing for vertical adjustment of the step subassembly 14 with respect to the mounting bracket 18. Each level of mounting holes defines a relatively higher or lower height point for the step subassembly in relation to the mounting bracket. Using the removable fasteners 20, shown as but not limited to bolt and nut assemblies, the user can remove the fasteners 20, move the step mount 26 and step subassembly 14 vertically relative to the mounting bracket 18, align cooperating mounting holes 22 and 24 at a selected height, and then re-insert the fasteners 20. The fasteners 20 also allow removal of the step subassembly 14 while leaving the mounting subassembly 12 attached to the hitch.

In the embodiment shown, the mounting bracket 18 and step mount 26 define cooperating contours such that the members "nest" or align with one another to ease attachment and adjustment of the assembly. The mounting bracket 18 is generally U-shaped, defining a vertically disposed channel into which is cooperatively received the tubular step mount 26. Alternately, the step mount could be generally U-shaped. Further cooperating contours, telescoping members, and the like are known in the art and can be used. Further features known in the art can be used to limit relative movement of the bracket and mount, such as cooperating shoulders defined in the members, stops or travel limiters, tongue and groove or tab and slot assemblies, and the like as are known in the art.

The collapsible step subassembly 14 provides multiple steps, such as upper step 30 and lower step 32. Each step provides a generally planar support surface 34 which, when in the in-use and extended positions, is generally horizontally oriented and supports a user, human or pet as they climb up or down from the vehicle bed. Each step preferably has a non-slip upper surface which can be permanently or removably attached to the step such as by adhesive, fastener, etc.

The steps have support structures 36 to which the support surfaces 34 are attached, removably or permanently, such as by bolt 37 and nut 39 assemblies. The exemplary support structures 36, best seen in FIG. 4, include a central tubular 38 extending longitudinally below the step surface and a plurality of permanently adjoined tubular struts 40 extending laterally therefrom. Practitioners will recognize that the step support structures can take various configurations, be made of tubular, I-shaped, U-shaped, or other shaped members, formed monolithically or joined together by fastening, such as by welding. The support structures 36 can be received partially or in whole into a cooperating recess defined on the bottom surface of the step and can be permanently or removably attached, such as by welding or bolt and nut assemblies.

Extending from and attached to the upper and lower steps 30, 32, or step support structures 36, are upper and lower step attachment members 42, 44, respectively, for removably or fixedly attaching the upper and lower steps 30, 32, to corresponding upper and lower movable supports 46, 48. In the embodiment shown, the upper and lower attachment members 42, 44 are tubular members which cooperate telescopically with corresponding upper and lower receptacles 50, 52, defined on the upper and lower movable supports. Attachment can be by other mechanisms known in the art.

The upper step 30 is attached at its attachment member 42 to the upper movable step support 46, preferably removably. In the embodiment shown, the upper movable support 46 has a body 54 defining a receptacle 50 for receiving the attachment member 42 of the upper step 30. The tubular attachment member 42 is slidingly received into the receptacle 50 and fastened thereto by one or more fasteners 57. The fastener 57 securely attaches the step to the movable support at aligned attachment holes 58 and 60 defined in the upper attachment member 42 and upper movable support 46, respectively. Preferably the fastener is removable, such as pull-pin assemblies (shown) or other similar fastening assemblies as are known in the art, such that the upper step can be readily removed from the upper movable support. In an embodiment, the stair assembly can be used with the upper step 30 removed, relying on the lower step 32 for access to the vehicle bed. Alternate attachment mechanisms are known in the art and acceptable here.

The upper movable support 46 is attached to the step mount 26 and movable between an in-use position, as seen in FIG. 1, and a stowed position, as seen in FIG. 3. In the embodiment shown, the upper movable support 46 is pivotally attached to the step mount 26 along a pivot axis defined along a suitable fastener 62 extending through mounting holes 64 defined in the movable support and cooperating pivot holes 66 defined in the step mount 26. The pivot fastener 62 can be readily removable, such as a pull-pin or the like, or more securely attached, such as by bolt and nut or the like. Other attachment mechanisms allowing relative movement will be recognized by those of skill in the art and can be used in various embodiments of the disclosure.

The upper movable support 46 is maintained in stable relationship with the step mount 26 in either the stowed or in-use position by a removable or releasable fastener 59. As shown, the upper movable support 46 defines a positioning hole 70 which aligns with a lower positioning hole 72 defined in the step mount 26 when the step is in the in-use position. Similarly, the positioning hole 70 aligns with an upper positioning hole 74 defined in the step mount 26 when the step is in the stowed position. The releasable or removable fastener 59 is inserted through selected and aligned holes when alternating between in-use and stowed positions. In the embodiment shown, the upper positioning hole 74 is defined through a vertically disposed flange 76 extending from the step mount tubular member. The flange 76 can be monolithically formed with or attached to the tubular member, such as by welding. Alternately, a similar flange can be attached to the movable support, instead of or in addition to the flange 76. Or other arrangements, including those providing the necessary positioning holes without the use of flanges, can be employed.

The lower step 32, lower attachment member 44, and lower movable support 48 operate in a fashion similar to that of the upper step 30, upper attachment member 42, and upper movable support 46.

The lower step is attached at its attachment member 44 to the lower movable support 48, preferably removably and adjustably. In the embodiment shown, the lower movable support 48 has a body 84 defining a receptacle 52 for receiving the attachment member 44 of the lower step 32. The tubular attachment member 44 is slidingly received into the receptacle 52 and fastened thereto by one or more fasteners 56. The fastener 56 securely attaches the step to the movable support at aligned attachment holes 86 and 88 defined in the lower attachment member 44 and lower movable support 48, respectively. Preferably the fastener is removable, such as a pull-pin assembly (shown) or other similar fastening assemblies as are known in the art, such that the lower step can be readily removed from the lower movable support. In an embodiment, the stair assembly can be used with the lower step 32 removed, relying on the upper step 30 for access to the vehicle bed. Thus the assembly may be usable where a vehicle bed is in close proximity to a curb or raised surface which would otherwise interfere with the lower step. Alternate attachment mechanisms are known in the art.

The lower step subassembly, in the embodiment shown, is also movable between a home position, seen in FIG. 2, and an extended (and in-use) position, seen in FIG. 1. The attachment member 44 is elongated and defines one or more extension holes 96 located longitudinally spaced from the attachment holes 86. The removable fastener 56 is either inserted into aligned extension hole 96 and attachment hole 88 of the lower movable support 48, or aligned attachment holes 86 and 88. Thus the lower step is adjustable between a home position and an extended position. Preferably the lower step is usable regardless of position but provides greater ease of use in the extended position. In an embodiment, the rear of the lower step support surface is substantially vertically aligned with the front of the upper step support surface.

The lower step, when in the generally vertical stowed position, can be in either the home or extended positions. In the home position, the lower step occupies less vertical space which may allow for use of the assembly in the stowed position where the lower step would otherwise interfere with the vehicle (a vehicle bed, tailgate, hatch-back door, swing door, rear-attached spare tire, etc.) or use of the vehicle (driving, loading and unloading, etc.).

The lower movable support 48 is attached to the step mount 26 and movable between an in-use position, as seen in FIG. 1, and a stowed position, as seen in FIG. 3. In the embodiment shown, the lower movable support 48 is pivotally attached to the step mount 26 along a pivot axis defined along a suitable fastener 90 extending through mounting holes 92 defined in the lower movable support and cooperating pivot holes 94 defined in the step mount 26. The pivot fastener 90 can be readily removable, such as a pull-pin or the like, or more securely attached, such as by bolt and nut or the like. Other attachment mechanisms allowing for relative movement will be recognized by those of skill in the art and can be used in various embodiments of the disclosure.

The lower movable support 48 is maintained in stable relationship with the step mount 26 in either a stowed or in-use position by a removable or releasable fastener 98. As shown, the lower movable support 48 defines a positioning hole 100 which aligns with a lower positioning hole 102 defined in the step mount 26 when the step is in the in-use position. Similarly, the positioning hole 100 aligns with an upper positioning hole 104 defined in the step mount 26 when the step is in the stowed position. The releasable or removable fastener 98 is inserted through selected and aligned holes when alternating between in-use and stowed positions. In the embodiment shown, the upper positioning hole 104 is defined through a vertically disposed flange 106 extending from the step mount tubular member. The flange 106 can be monolithically formed with or attached to the tubular member, such as by welding. Alternately, a flange can be formed on the movable support, instead of or in addition to the flange 106. Or other arrangements, including those providing the necessary positioning holes without the use of flanges, can be employed.

Figure 5:
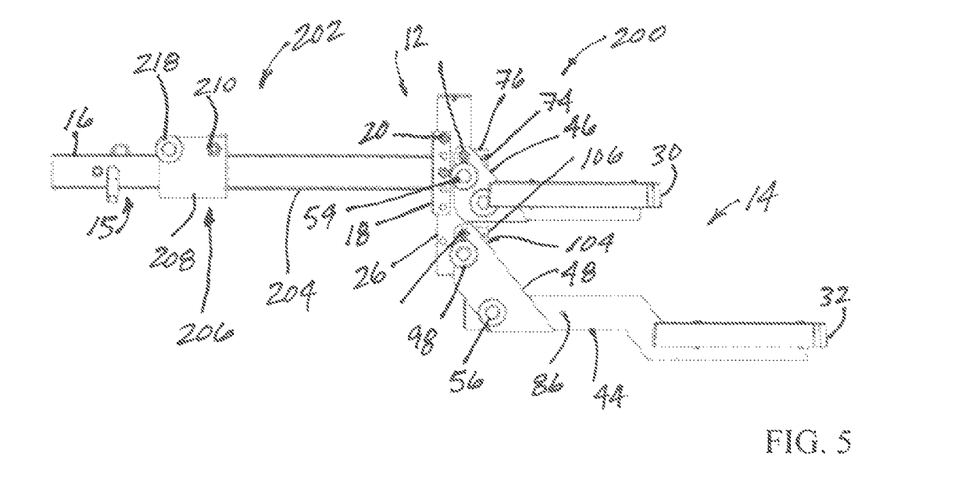
FIG. 5 is a side elevational view of an exemplary hitch-mountable, collapsible, multiple-step, stair assembly seen in an in-use position, wherein the steps are generally horizontal and wherein the lower step is extended forwardly, according to aspects of the disclosure.
Figure 6:
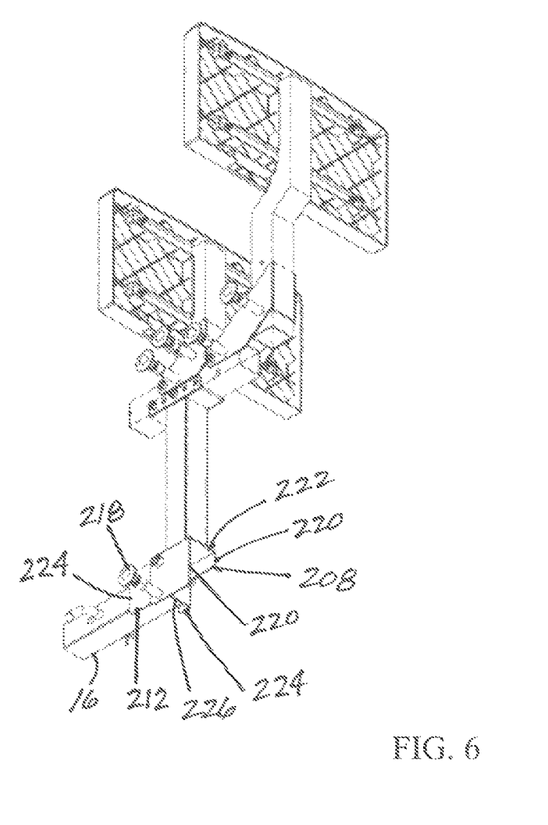
FIG. 6 is a bottom perspective view of the exemplary collapsible stair assembly of FIG. 5 seen in a stowed position, wherein the steps are generally vertical and wherein the lower step is in the extended position, according to aspects of the disclosure.
Figure 7:
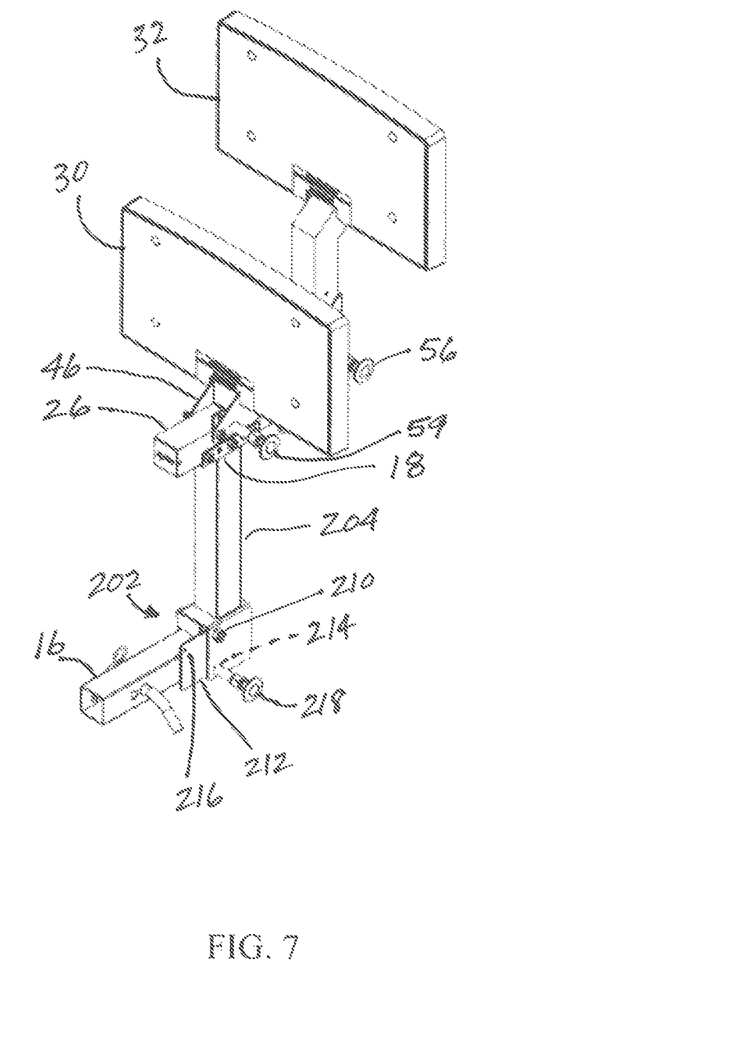
FIG. 7 is a top perspective view of the exemplary collapsible stair assembly of FIG. 5 in a stowed position, according to aspects of the disclosure.

FIG. 5 is a side elevational view of an exemplary hitch-mountable, collapsible, multiple-step, stair assembly seen in an in-use position, wherein the steps are generally horizontal and wherein the lower step is extended forwardly, according to aspects of the disclosure. FIG. 6 is a bottom perspective view of the exemplary collapsible stair assembly of FIG. 5 seen in a stowed position, wherein the steps are generally vertical and wherein the lower step is in the extended position, according to aspects of the disclosure. FIG. 7 is a top perspective view of the exemplary collapsible stair assembly of FIG. 5 in a stowed position, according to aspects of the disclosure. The FIGS. 5-7 are discussed collectively.

The collapsible stair assembly 200, is movable by a user between the in-use position, with an extendable lower step shown in its extended position in FIG. 5, and a stowed position, wherein the steps are in a generally vertical in orientation in FIGS. 6-7. The lower step is seen in the extended position in FIGS. 5-7.

The alternate embodiment seen in FIGS. 5-7 shares many commonalties with the embodiments disclosed in FIGS. 1-4. The stair assembly 200 has a mounting subassembly 12 and a collapsible step subassembly 14. The collapsible step subassembly is like that described above and will not be described again here. An abbreviated set of reference numbers are indicated in FIGS. 5-7 for orientation and identification of parts. Similarly, the alternate embodiment has a mounting subassembly 12 which is substantially like that described above with like parts not described again here. A few like parts are indicated for orientation.

In contrast to the embodiments of FIGS. 1-4, the embodiment 200 seen in FIGS. 5-7 has an extension subassembly 202 interposed between the mounting bracket 18 and the insert tubular 16. The extension subassembly 202 includes an elongated tubular member 204 fixedly attached to a mounting bracket 18 at one end and fixedly attached to a rotatable hinge bracket 208 at the other end. The hinge bracket 208 defines pivot holes through which a pivot pin 210 extends. The hinge bracket 208 (and attached elongated tubular member) rotate about the generally horizontal pivot axis between stowed and in-use positions. The hinge bracket 208 further defines a positioning hole through which a releasable or removable fastener 218 extends, such as a pull-pin or the like.

The hinge assembly 206 includes the hinge bracket 208 and a cooperating fixed bracket 212 fixedly attached to the insert tubular 16. The fixed bracket 212 defines cooperating pivot holes through which the pivot pin 210 also extends. The pivot pin can be a bolt and nut assembly, pin and hook assembly, etc., and can be removable or permanent, as is known in the art. The fixed bracket 212 further defines on a side plate 224 two spaced apart positioning holes 214 and 216 which align with either the positioning hole (through which the fastener 218 extends) in the hinge bracket 208. The removable fastener 218 extends through lower positioning hole 214 of the fixed bracket and the positioning hole of the hinge bracket 208 fixing the orientation of the assembly in the stowed position. The fastener 218 is temporarily removed while the hinge bracket and attached elongated tubular member are rotated with respect to one another to the in-use position, and then inserted through upper positioning hole 216 of the fixed bracket 212 and the cooperating and now-aligned positioning hole in the hinge bracket 208.

The hinge and fixed brackets, 212 and 208, respectively, also have cooperating surfaces and contours in the shown embodiment. The hinge bracket 208 includes opposing side plates 220 and a connecting face plate 222, and defines a channel into which fits the fixed bracket 212 which has corresponding opposing side plates 224 and face plate 226. The face plates 222 and 226 abut one another when the assembly is in the in-use position. Such abutment preferably prevents over-rotation of the pivoting portion of the assembly and assists in aligning the positioning holes.

The extension subassembly 202 effectively spaces the step subassembly further from the vehicle hitch when in use. This allows the assembly to be used with vehicles having a tailgate or drop gate such that the steps are positioned to allow ease of climbing into the vehicle bed. Note that the embodiment shown includes all of the adjustability and moving parts of the step subassembly and mounting bracket. Thus the steps can be adjusted in relative height to the vehicle bed or ground. Further, the steps can be removable, as described above.

The lower step can be moved to an extended position as shown or to a home position, as with the embodiment seen in FIGS. 1-4. Further, the steps remain selectively pivotable between stowed and in-use positions, as above. Hence the embodiment at FIGS. 5-7 can be moved to a stowed position with the steps generally vertical while the hinge assembly remains in an in-use position. Alternately, the steps can remain in the in-use position (with the lower step in the extended or home position) while the hinge assembly is moved to the stowed position. Again alternately, both the hinge assembly and step assemblies can be placed in their respective stowed positions.

Although the embodiment of FIGS. 5-7 maintains the adjustability and rotary movability of the step subassembly and mounting bracket, in other embodiments the steps can be fixedly in an in-use position and not rotatable. However, it is preferred that the same step subassembly, etc., is usable with and without the extension subassembly such that the product can be adjusted for use with various vehicle types. Hence, the elongated tubular member is removably attachable at the mounting bracket 18 to the step mount 26 by removable fasteners. It is therefore preferred to have a collapsible stair assembly kit including the collapsible step subassembly, the mounting subassembly, and the extension subassembly, thus allowing a user to use the assemblies on various vehicle types.

Alternate hinge subassemblies capable of allowing relative pivoting movement between the insert tubular 166 and the extension tubular 204 will be apparent to those of skill in the art.

The terms "releasable" and removable" are used throughout and are understood not to be exclusive of one another. That is, a single fastener type can be considered removable and releasable. "Releasable" and/or "removable" attachment mechanisms, fasteners, and the like, as used herein, refer to mechanisms allowing repeated assembly and disassembly of the attachable members. Such mechanisms can include the attached members or portions thereof, e.g., positioning holes, cooperating shoulders and contours, etc. Such mechanisms are well known in the art. Where a particular mechanism is called out in a preferred embodiment, practitioners will recognize suitable substitutes.

The foregoing description of the specific embodiments discloses the general nature of the embodiments herein that others can, by applying current knowledge, readily modify and/or adapt for various applications without departing from the spirit of the invention. Such adaptations and modifications should and are intended to be comprehended within the claimed invention or range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The claims appended hereto set forth the scope and limitations of the invention.

It is claimed:

1. A collapsible stair assembly mountable to a vehicle hitch receiver for providing ease of access to a vehicle bed, the assembly comprising:
    an insert releasably attachable to a vehicle hitch receiver;
    a mounting bracket attached to the insert, wherein the mounting bracket is releasably attachable to a step subassembly, the mounting bracket defining multiple attachment points of varying height in relation to the vehicle bed for adjustable mounting of the step subassembly;
    the step subassembly having multiple steps including an upper and a lower step, each step defining a generally planar support surface for supporting a user, each step pivotally movable between a generally vertical stowed position in which the support surface is generally vertically oriented and a generally horizontal in-use position in which the support surface is generally horizontally oriented, each step releasably secured in either the stowed or in-use position, wherein the step subassembly comprises a lower movable support attachable to the lower step, the lower movable support pivotal between the stowed and the in-use position, wherein the lower step slidingly engages a cooperating receptacle defined in the lower movable support; and
    the lower step slidably movable between a home position relatively closer to the vehicle and an extended position relatively further from the vehicle, the support surface of the lower step generally horizontally orientated during sliding movement between the home and extended positions, wherein the lower step is usable for supporting a user whether in the home position or extended position.

2. The assembly according to claim 1, wherein the upper step is releasably secured in the stowed position by a first releasable fastener engaging the upper movable support.

3. The assembly according to claim 2, wherein the upper step is releasably secured in the in-use position by the first releasable fastener engaging the upper movable support.

4. The assembly according to claim 3, wherein the lower step is releasably secured in the stowed position by a second releasable fastener engaging the lower movable support.

5. The assembly according to claim 4, wherein the lower step is releasably secured in the in-use position by the second releasable fastener engaging the lower movable support.

6. The assembly according to claim 1, wherein the step subassembly further comprises an upper movable support attachable to the upper step, the upper movable support pivotal between the stowed and the in-use position.

7. The assembly of claim 1, further comprising a hinged connection interposed between the insert and the mounting bracket, the hinged connection selectively movable between the in-use position and the stowed position.

8. A collapsible stair assembly mountable to a vehicle hitch receiver for providing ease of access to a vehicle bed, the assembly comprising:
   an insert releasably attachable to a vehicle hitch receiver;
   a mounting bracket attached to the insert, wherein the mounting bracket is releasably attachable to a step subassembly, the mounting bracket defining multiple attachment points of varying height in relation to the vehicle bed for adjustable mounting of the step subassembly;
   the step subassembly having multiple steps including an upper and a lower step, each step defining a generally planar support surface for supporting a user, each step pivotally movable between a generally vertical stowed position in which the support surface is generally vertically oriented and a generally horizontal in-use position in which the support surface is generally horizontally oriented, each step releasably secured in either the stowed or in-use position, wherein the step subassembly further comprises a lower movable support attachable to the lower step, the lower movable support pivotal between the stowed and the in-use position, wherein the lower step slidingly engages a cooperating receptacle defined in the lower movable support; and
   the lower step slidably movable between a home position and an extended position, wherein the home position is relatively closer to the vehicle when the lower step is in the in-use position and the extended position is relatively further from the vehicle when the lower step is in the in-use position.

* * * * *